Figure 1:
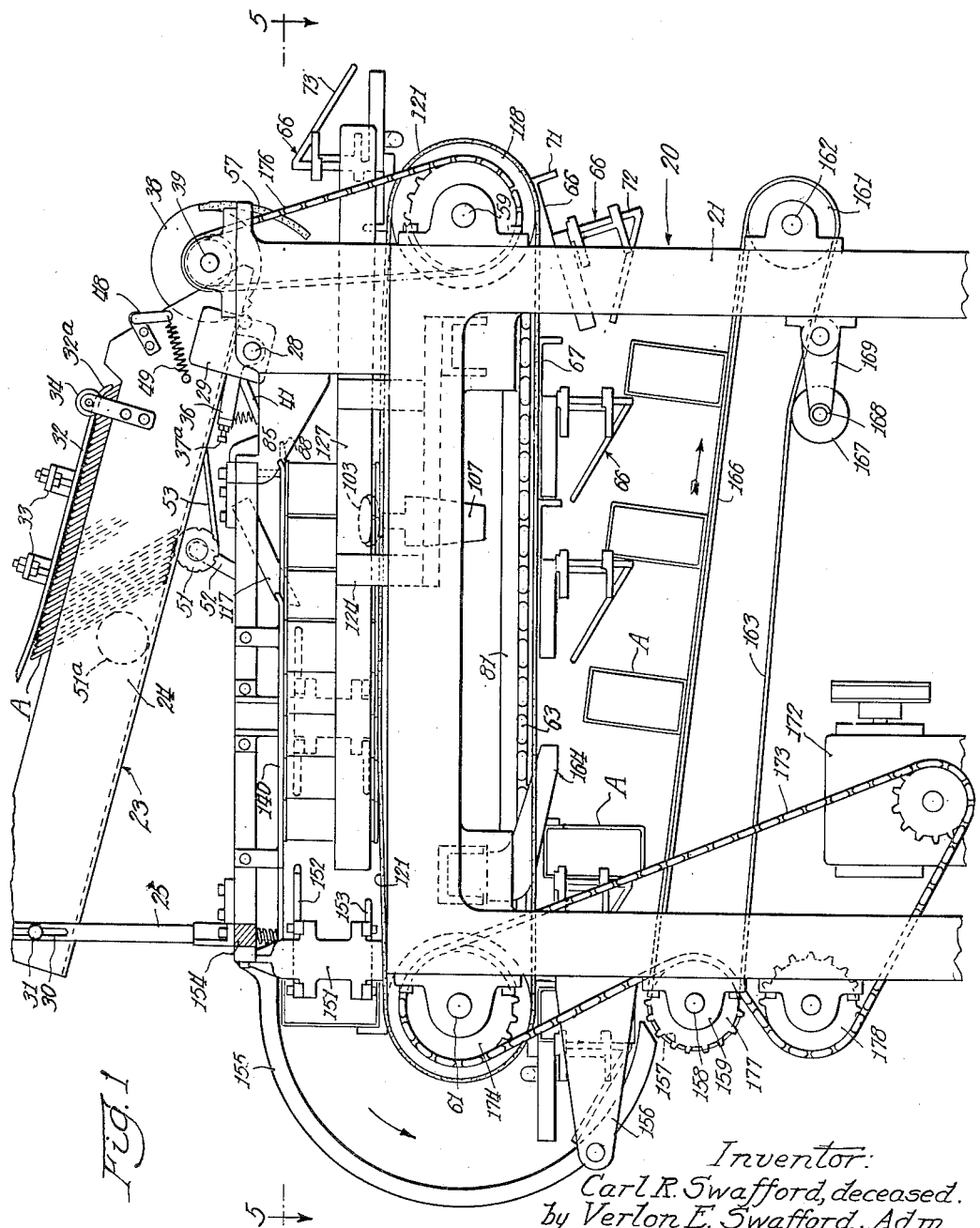

Dec. 15, 1953  C. R. SWAFFORD  2,662,356
CARTON LOADING MACHINE
Filed Feb. 28, 1952  11 Sheets-Sheet 1

Inventor:
Carl R. Swafford, deceased.
by Verlon E. Swafford, Adm.
By: EdWagonseller  Atty.

Inventor:
Carl R. Swafford, deceased.
by Verlon E. Swafford, Adm.
By: Ed Wagonseller  Atty.

Dec. 15, 1953  C. R. SWAFFORD  2,662,356
CARTON LOADING MACHINE
Filed Feb. 28, 1952  11 Sheets-Sheet 3

Inventor:
Carl R. Swafford, deceased.
by Verlon E. Swafford, Adm.
By: E.A.Wagmseller  Atty.

Dec. 15, 1953    C. R. SWAFFORD    2,662,355
CARTON LOADING MACHINE
Filed Feb. 28, 1952    11 Sheets-Sheet 6

Inventor:
Carl R. Swafford, deceased.
by Verlon E. Swafford, Adm.
By: Ed Wagenseller  Atty.

Dec. 15, 1953     C. R. SWAFFORD     2,662,356
CARTON LOADING MACHINE

Filed Feb. 28, 1952     11 Sheets-Sheet 7

Inventor:
Carl R. Swafford, deceased.
by Verlon E. Swafford, Adm.
By: E.A. Wagonseller Atty.

Dec. 15, 1953  C. R. SWAFFORD  2,662,356
CARTON LOADING MACHINE
Filed Feb. 28, 1952  11 Sheets-Sheet 9

Inventor:
Carl R. Swafford, deceased.
by Verlon E. Swafford, Adm.
By: EdWagoneller  Atty:

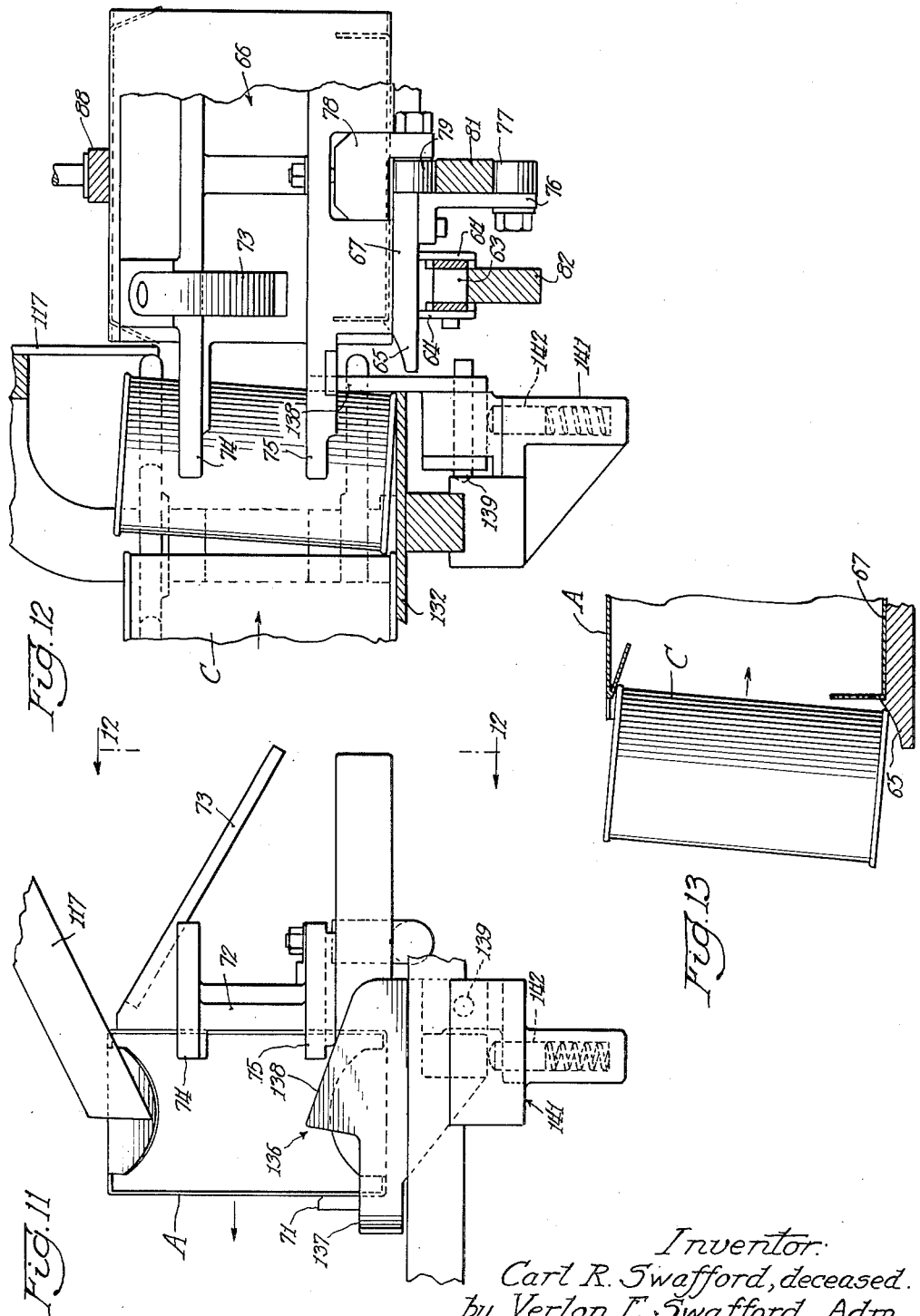

Dec. 15, 1953  C. R. SWAFFORD  2,662,356
CARTON LOADING MACHINE
Filed Feb. 28, 1952  11 Sheets-Sheet 11
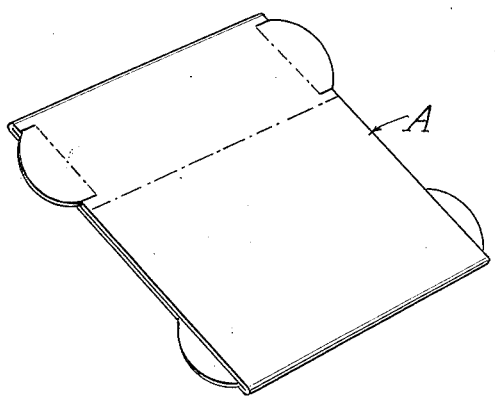
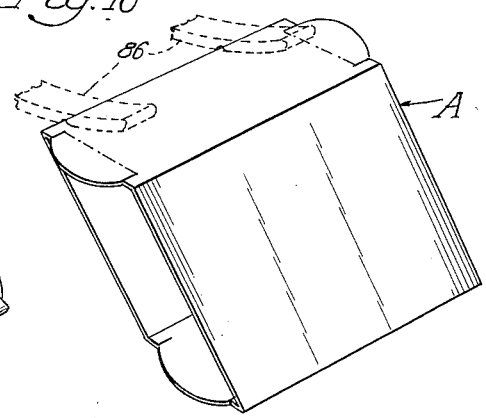
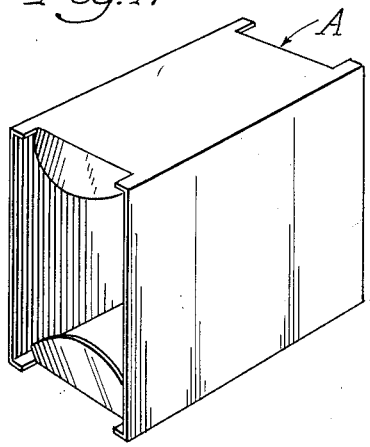
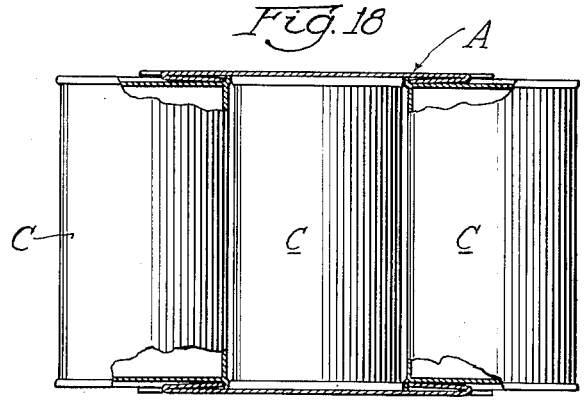
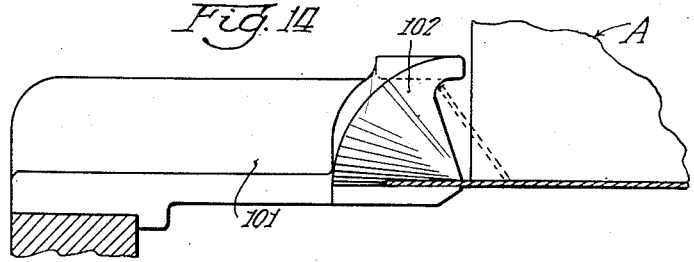
Inventor:
Carl R. Swafford, deceased.
by Verlon E. Swafford, Adm.
By: E a Wagonseller   Atty:

Patented Dec. 15, 1953

2,662,356

UNITED STATES PATENT OFFICE 2,662,356

CARTON LOADING MACHINE

Carl R. Swafford, deceased, late of Philadelphia, Pa., by Verlon E. Swafford, administrator, Franklin, N. C., assignor to Container Corporation of America, Chicago, Ill., a corporation of Delaware Application February 28, 1952, Serial No. 274,002

11 Claims. (Cl. 53—91)

1

The present invention relates to packaging apparatus generally and more particularly to an apparatus for automatically feeding and erecting folded cartons and loading or assembling canned articles therein.

An important object of this invention is the provision of a packaging apparatus embodying means for automatically feeding collapsed or folded cartons, erecting said cartons to receive canned articles and loading or assembling said articles therein.

Another object of the invention is the provision of a fully automatic continuous motion apparatus for loading or assembling canned articles in open ended cartons.

A further object of the invention is the provision of an apparatus of the character set forth which is simple in construction, highly efficient in operation and capable of a high rate of production.

Other and further objects and advantages of the present invention will become apparent from the following description when considered in connection with the accompanying drawings.

The present invention will be described in relation to a particular type of carton which has been adopted in the trade for packaging filled, flange type cans, wherein the said cans are arranged within the carton in side-by-side in-line relationship. The carton is of generally rectangular shape with open ends having tabs at the top and bottom of the open ends, which tabs when folded inwardly engage the upper and lower chimes or flanges of the outer cans in the carton thereby locking the cans while they protrude from the open ends of the carton. It will be understood, however, the invention may be utilized for assembling articles in other types of containers or cartons and that the present description is merely illustrative of one form in which the invention may be practiced.

According to the invention there is provided an apparatus embodying means for feeding collapsed cartons, one to each of a series of carriers movable along a path of travel, means for erecting the cartons as they move on said carriers, can guide means on opposite sides of the paths of travel of the carriers, means for delivering cans to the can guide means, means carried on each of the carriers for opening gate means when a carton is moved into registration with the guide means, and means carried on the carriers adapted to engage the leading can in each of the guide means to urge the leading can into an open end of the carton.

For a more detailed description of the invention, reference is made to the drawings illustrating one form of apparatus embodying the invention, in which

2

Figure 2:
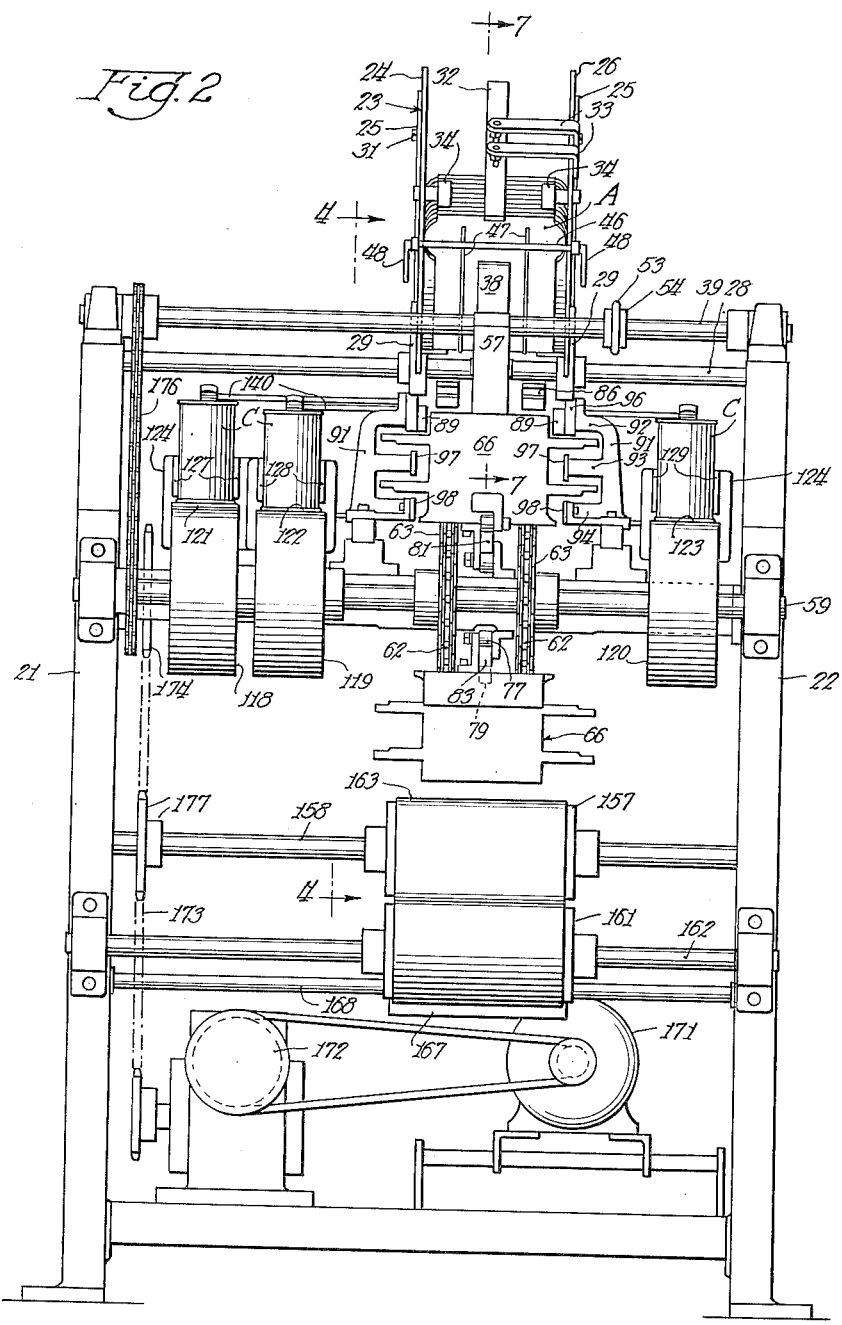
Figure 3:
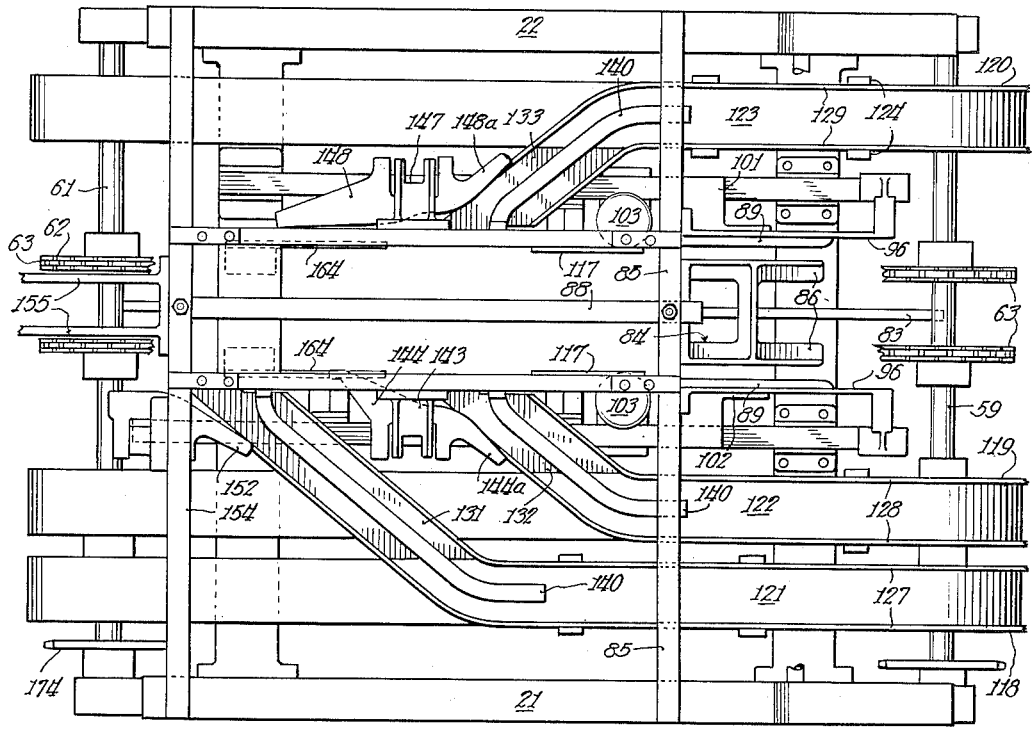
Figure 4:
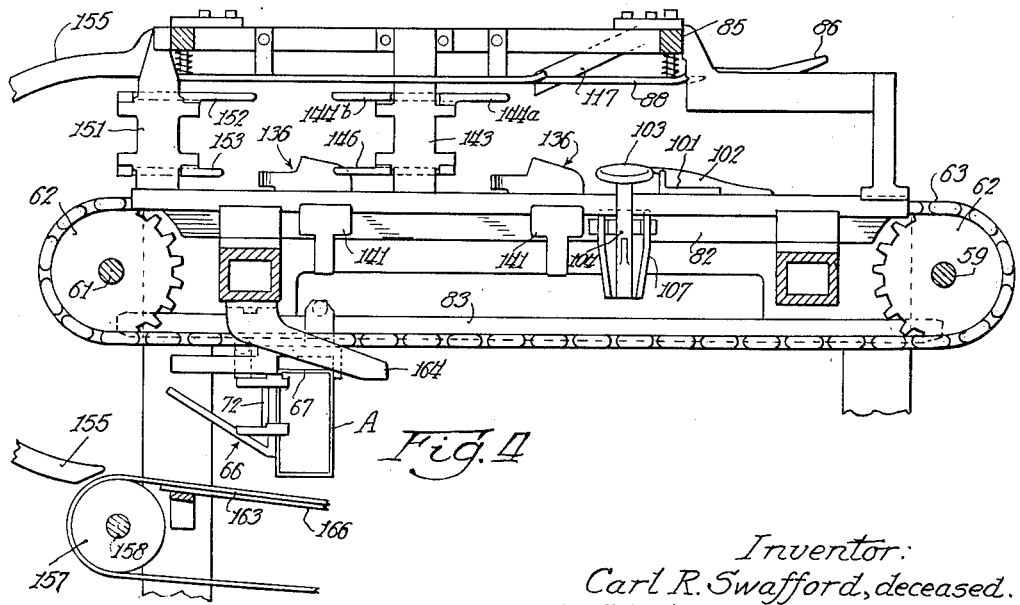
Figure 5:
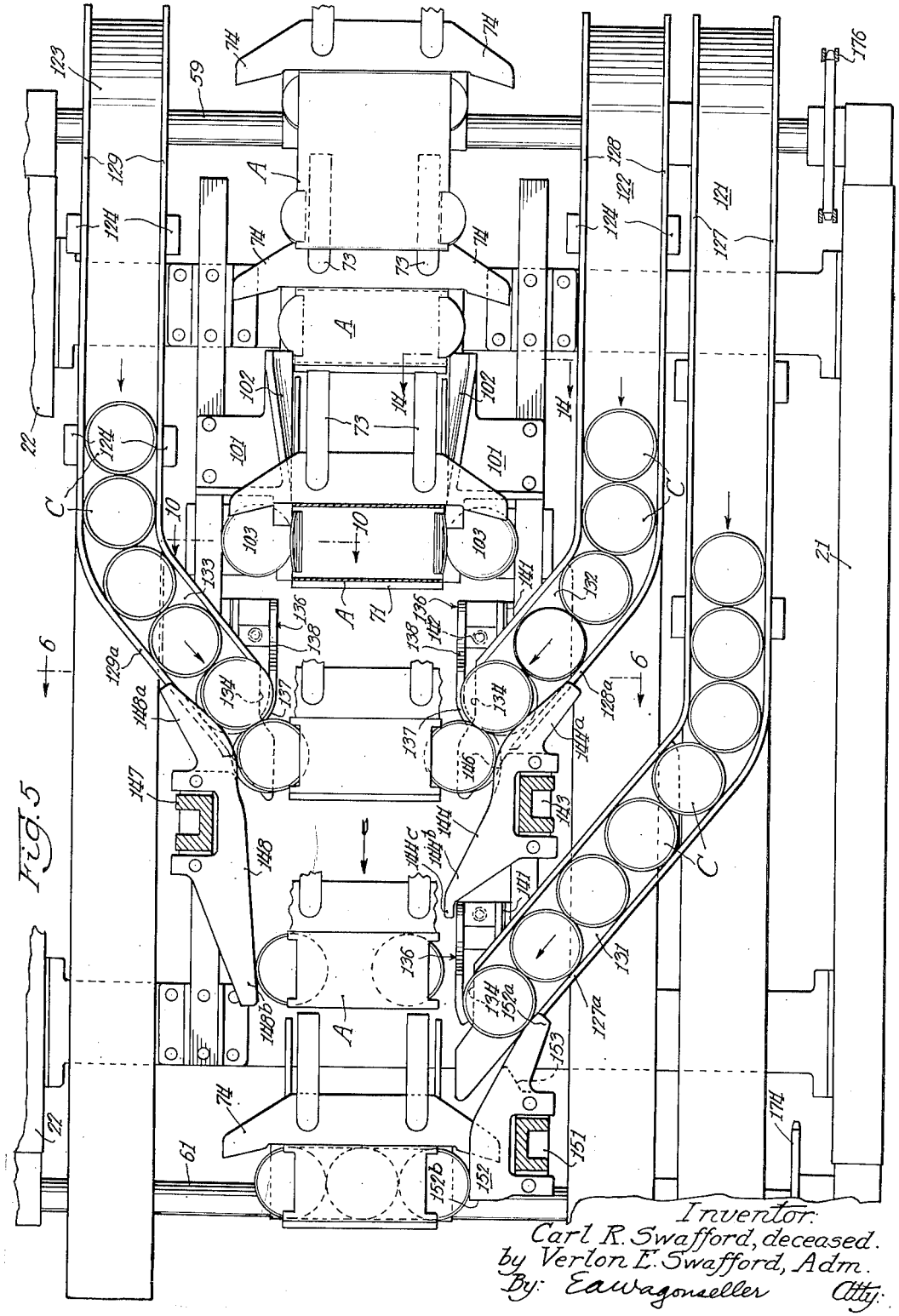
Figure 6:
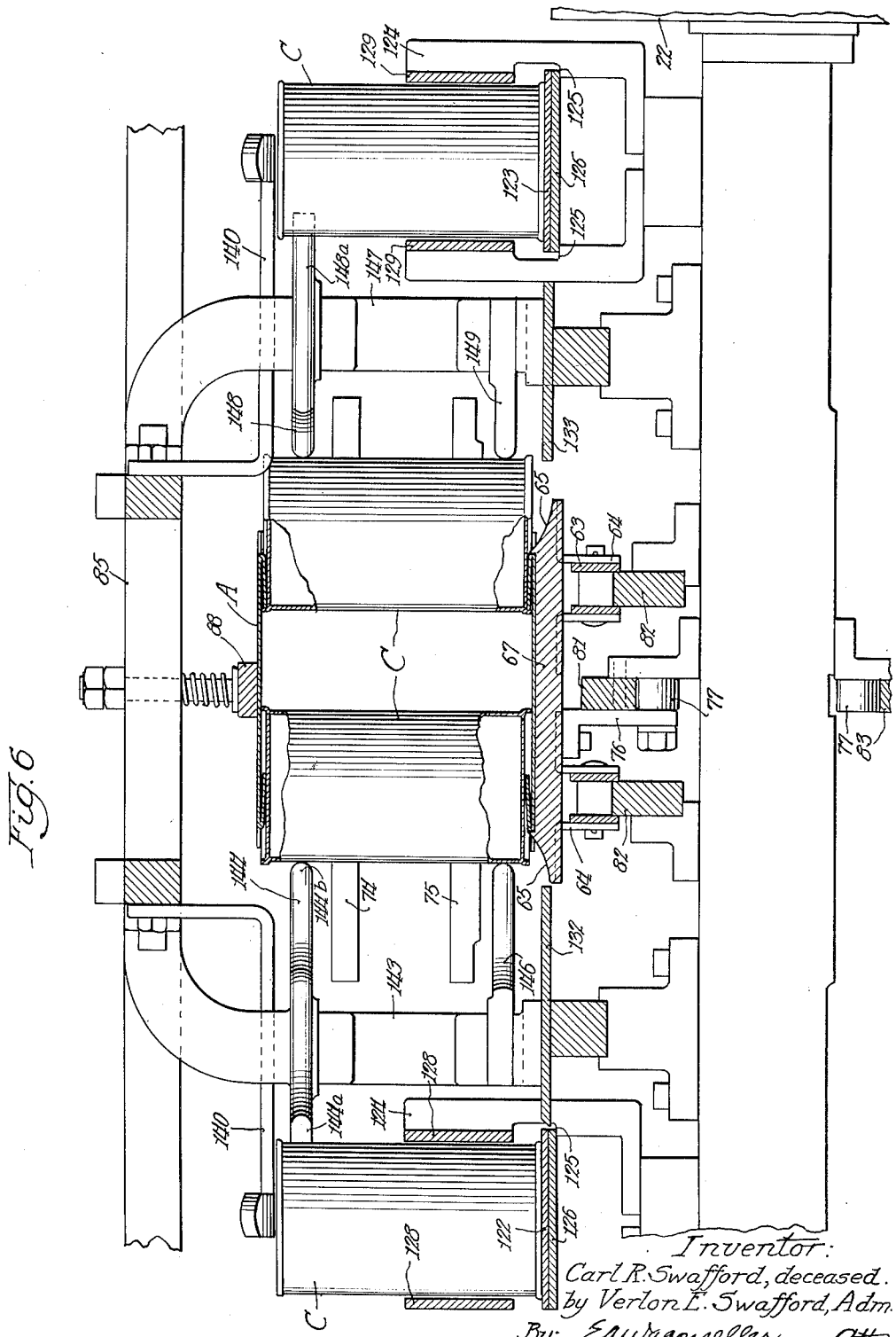
Figure 7:
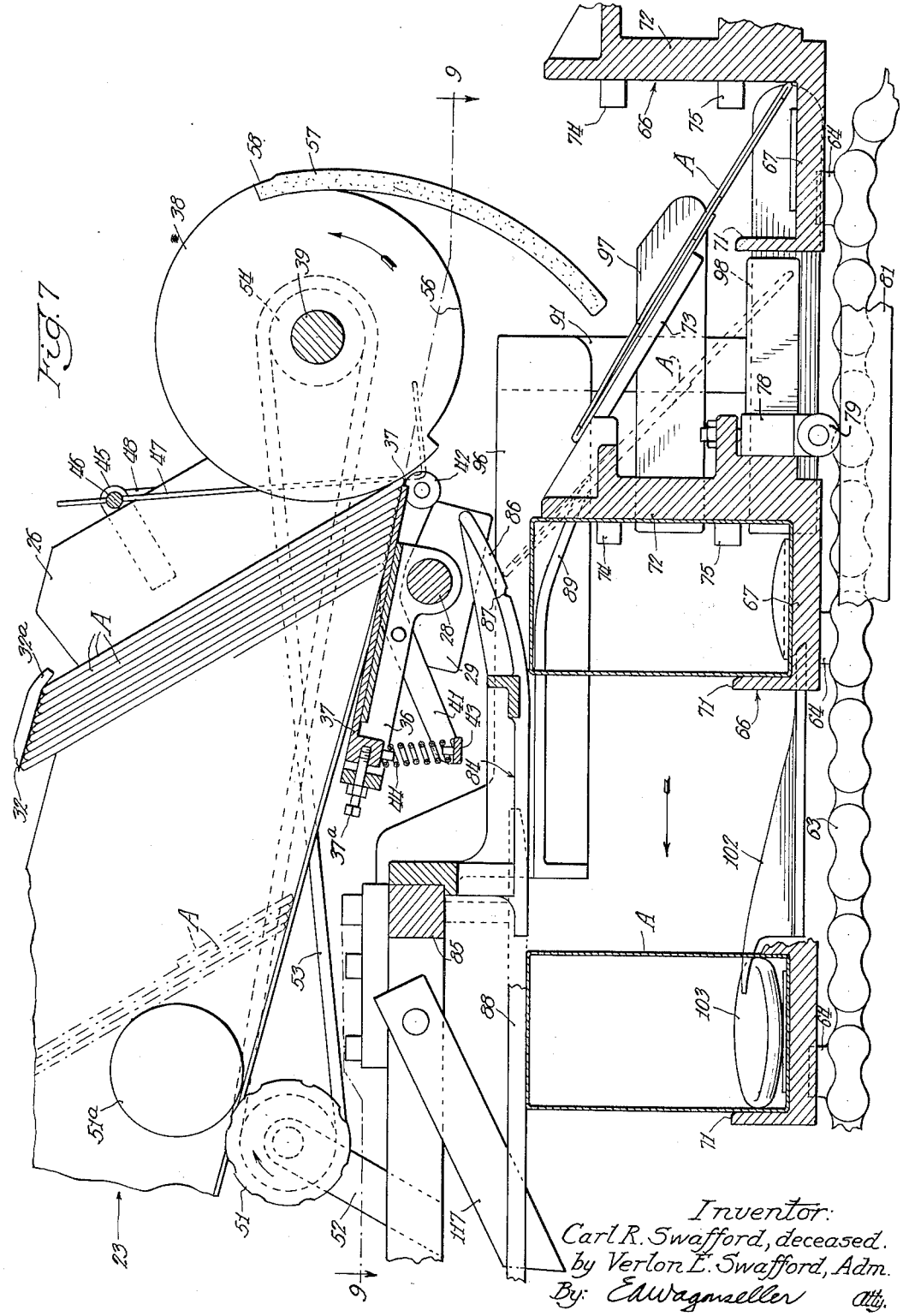
Figure 8:
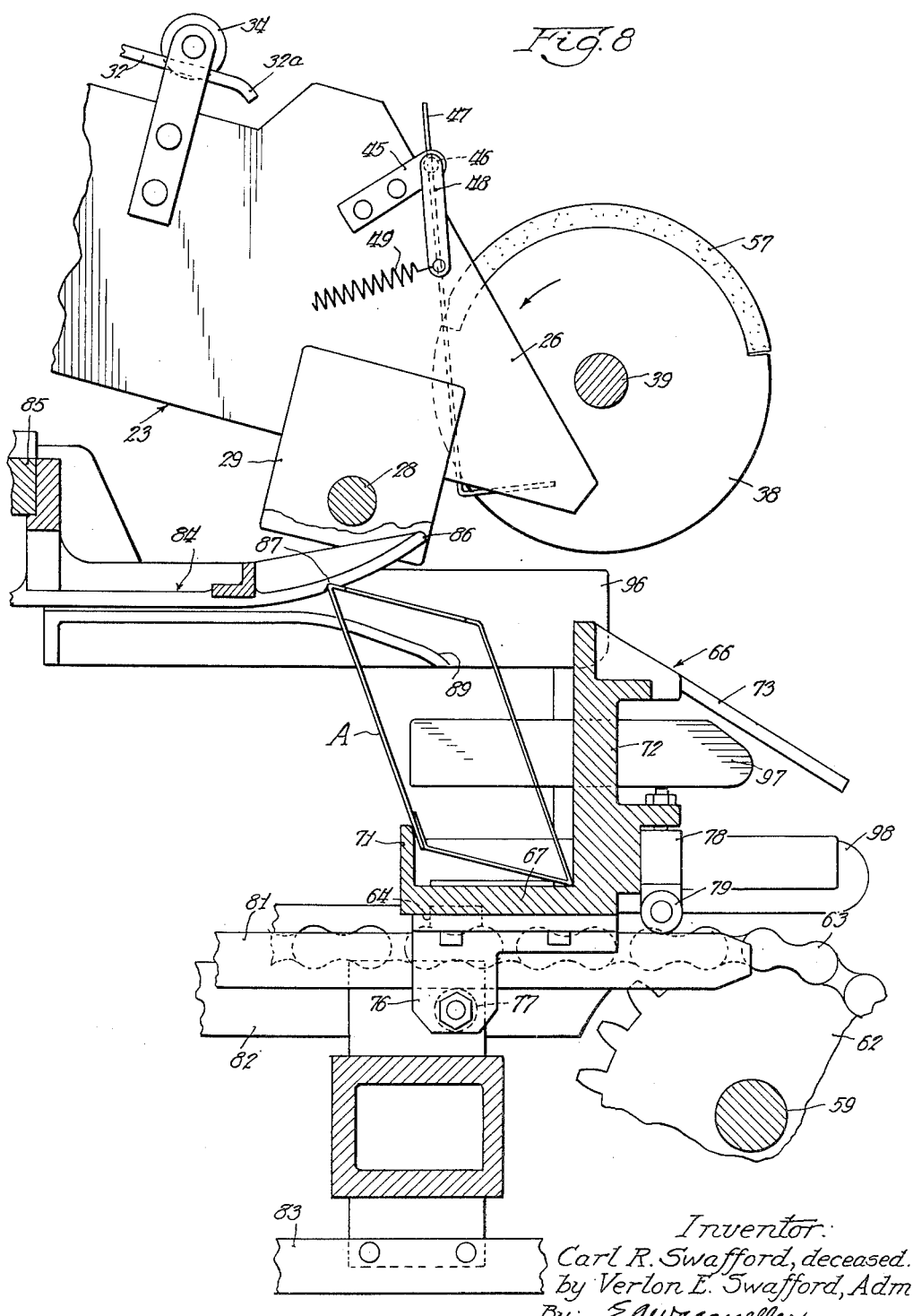
Figure 9:
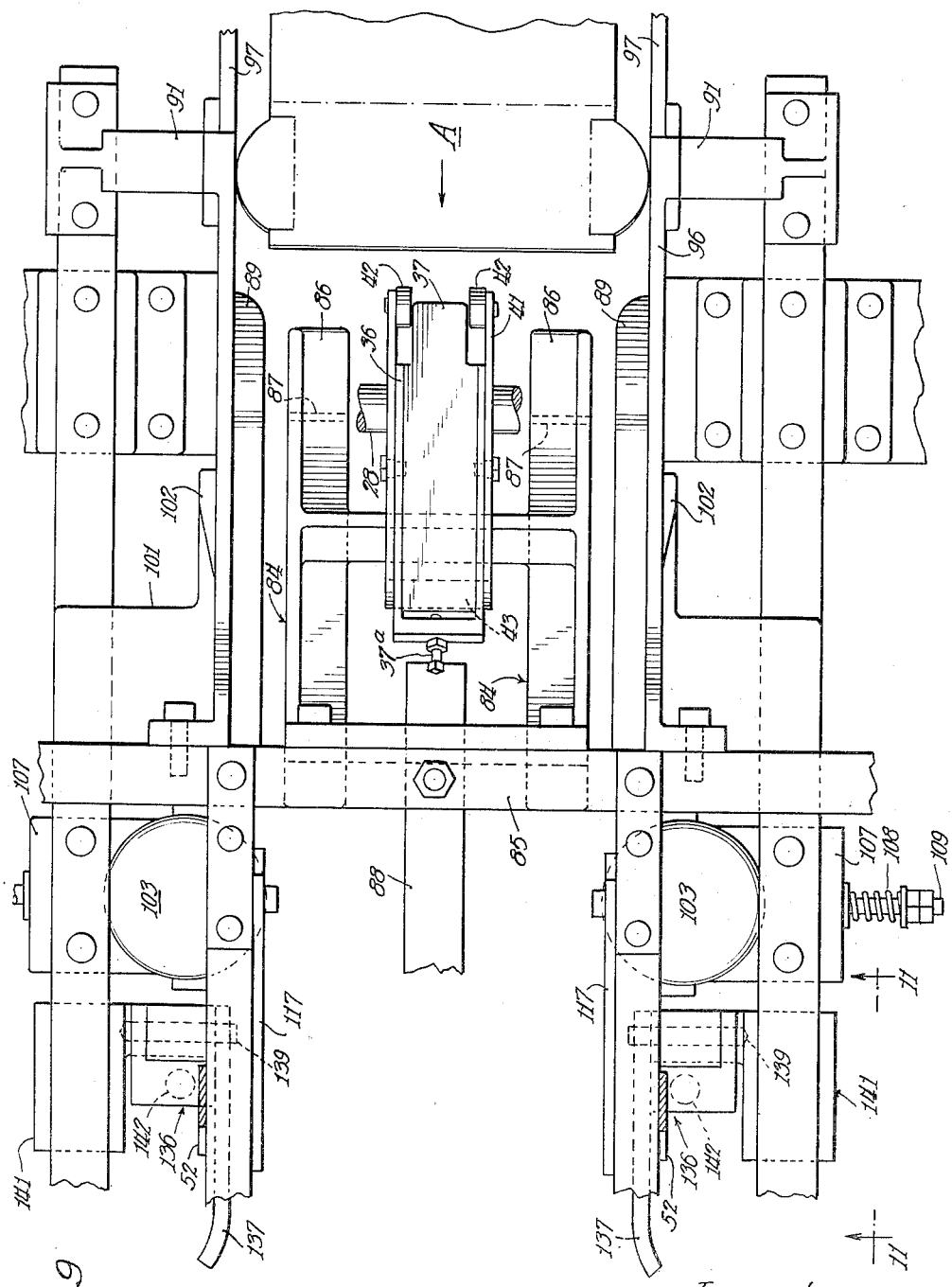
Figure 10:
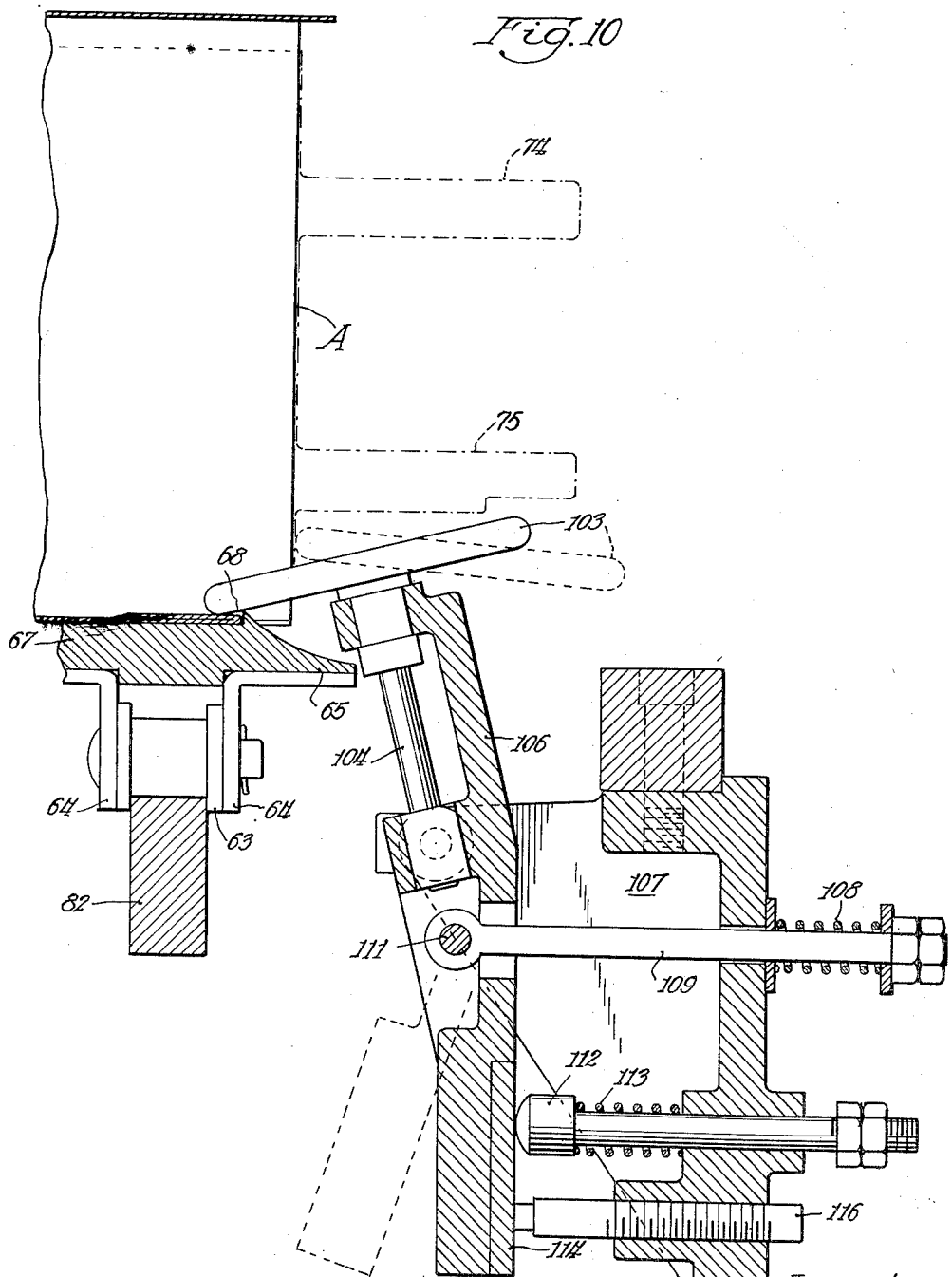

Fig. 1 is a side elevational view of an apparatus in accordance with the invention, Fig. 2 is a front end elevational view of the apparatus, Fig. 3 is a top plan view of the apparatus with the carton feed mechanism omitted, Fig. 4 is a cross-sectional view taken substantially on line 4—4 of Fig. 2, Fig. 5 is a cross-sectional view on an enlarged scale taken substantially on line 5—5 of Fig. 1, Fig. 6 is a cross-sectional view on an enlarged scale taken substantially on line 6—6 of Fig. 5, Fig. 7 is a cross-sectional view on an enlarged scale taken substantially on line 7—7 of Fig. 2, Fig. 8 is a fragmentary view similar to Fig. 7, but showing the parts in different positions of operation, Fig. 9 is a cross-sectional view taken substantially on line 9—9 of Fig. 7, Fig. 10 is a cross-sectional view on an enlarged scale taken substantially on line 10—10 of Fig. 5, Fig. 11 is a fragmentary elevational view looking in the direction of the arrows 11—11 of Fig. 9, Fig. 12 is a cross-sectional view taken substantially on line 12—12 of Fig. 11, Fig. 13 is a diagrammatic view illustrating the entry of a can into a carton, Fig. 14 is a cross-sectional view on an enlarged scale taken substantially on line 14—14 of Fig. 5, Fig. 15 is a perspective view of a carton in collapsed condition, Fig. 16 is a perspective view showing a carton in the process of being erected, Fig. 17 is a perspective view of a fully erected carton, and Fig. 18 is a longitudinal cross-sectional view illustrating an assembly of cans within the carton and the manner in which they are secured therein.

Referring to the drawings, the apparatus comprises a suitable frame indicated generally by the numeral 20, the said frame being formed of side members 21 and 22 joined together by a plurality of transverse members suitably located to provide a rigid frame structure. Considering first the carton feed means, a hopper, indicated generally by the numeral 23 is formed of members 24 and 26 spacedly arranged in opposed complemental relation to provide a channel-like structure having a relatively wide longitudinal slot in the bottom thereof. The hopper 23 is pivotally supported at the forward end, on a transverse shaft 28 carried on the frame, by means of brackets 29 depending from the members 24 and 26. The hopper is adjustably supported at the rearward end by means of upright members 25 which rest on a cross member on the frame, these members each being slotted as at 30 to accommodate a stud 31 projecting laterally from the members 24 and 26. As will be apparent, the hopper is inclined towards its delivery end and the angle of inclination may be adjusted as desired. A guide member 32 is arranged above the hopper and is supported by overhanging brackets 33 which are attached to the hopper member 26. The end of the guide member 32 is bent downwardly as at 32a and is adapted to engage the upper edges of the cartons A as they move to the delivery end of the hopper to dispose the cartons at an angle slanting forwardly, as illustrated in Fig. 7. Additionally, rollers 34 are mounted one one each side of the hopper, the rollers serving to align the cartons properly and also to assist the guide member 32 in disposing the cartons at an angle slanting forwardly.

Mounted on the shaft 28 below the delivery end of the hopper 23 is a channeled guide member 36 and supported in said member is a retarder tongue 37. This retarder tongue is connected to an adjusting screw 37a by means of which the retarder tongue may be adjusted so that its end is disposed in desired spaced relation to a combing wheel 38 supported for rotation on shaft 39 suitably journaled in the frame members 21 and 22. As is apparent by reference to Fig. 7, the end of the retarder tongue 37 extends into the space between the hopper members 24 and 26 so that the lower edges of the leading cartons are actually supported on the retarder tongue. A retarder yoke 41 formed of parallel members embracing the guide member 36 is pivotally supported on the member 36 and carries a pair of retarding rollers 42 between the forward ends with a roller on each side of the retarder tongue 37. At the rearward end of the yoke 41 the members are connected by a cross member 43. A spring 44 supported on the cross member 43 serves to urge the retarder rollers 42 into engagement with the combing wheel 38. Mounted on a shaft 46 supported by lugs 45 attached to the hopper members 24 and 26 are a pair of guide fingers 47 arranged on opposite sides of the combing wheel. These fingers extend to a point below the retarder tongue 37 and each has an end portion bent at a right angle. Mounted on each end of the shaft 46 is a lever 48 to which is connected a spring 49. The fingers 47 and levers 48 are each rigidly secured to shaft 46 so the springs 49 bias the guide fingers 47 in a direction to engage the leading carton in the hopper and thereby maintain the leading carton in proper alignment as it is being delivered from the hopper into a carrier, hereinafter to be described. A serrated feed roller 51 supported on a suitable bracket 52 mounted on a frame member is arranged to extend slightly into the space between the hopper members 24 and 26 so as to engage the lower edges of cartons within the hopper. The said roller is driven by a belt 53 which is in turn driven by a pulley 54 mounted on shaft 39. Rotation of the roller 51 serves to urge the cartons toward the delivery end of the hopper. A weight roller 51a is disposed in the hopper 23 and abuts the rearmost carton therein to urge the cartons disposed forwardly thereof in the direction of the delivery end of the hopper.

The combing wheel 38 is recessed for a portion of its peripheral surface, as at 56, to accommodate a strip of resilient friction material 57 such as sponge rubber or the like, the said strip being anchored only at one point as at 58. Thus, as the combing wheel 38 is rotated in the direction of the arrow (Fig. 7) the free end portion of the strip 57 is urged by centrigual force outwardly and away from the wheel 38 so that a major portion of the said strip is caused to strike against the leading carton in the hopper thereby imparting to it a downward force and effecting displacement of the carton from the hopper to a carrier 66 disposed below.

Journaled in suitable bearing blocks supported at the front and rear ends of the frame structure are shafts 59 and 61, each carrying a pair of spaced sprocket wheels 62 on which are carried a pair of parallel sprocket chains 63. To each of the said sprocket chains 63 is connected at regularly spaced intervals spaced lugs 64 depending from a carrier indicated generally by the numeral 66. Two pairs of such lugs depend from each carrier and each pair of lugs embraces a link in the sprocket chains 63. A plurality of carriers are provided and each carrier 66 comprises a bottom 67 having a shallow recess 68 corresponding to the bottom of the carton. The sides 65 of the bottom 67 extend outwardly beyond the sprocket chains 63 and slope downwardly to form camming portions, as illustrated more particularly in Figs. 10 and 13. A relatively low front wall 71 extends upwardly from the front edge of the bottom 67 and a rear wall 72 extends upwardly from the rear edge of the bottom 67 in parallel relation to the front wall 71 and perpendicularly to the bottom 67. The distance between the front and rear walls 71 and 72 respectively, is equal to the width of the carton and, as will be clearly seen by reference to the drawings, each carrier is open at the top and at both sides. A pair of guide strips 73 attached to the rear wall 72 extend rearwardly and downwardly from the top of the rear wall 72 to a point slightly above the front wall of the succeeding carrier. Projecting from each side edge of the rear wall 72 are upper and lower arms 74 and 75 respectively. The said arms are spaced vertically and are angled slightly forwardly extending beyond the bottom 67, as illustrated clearly in Fig. 5. Each of the carriers is provided with a depending bracket 76 which supports a roller 77 below the center of the carrier. Supported from a bracket 78 rearwardly of the rear wall of the carrier is a roller 79. The rollers 77 and 79 embrace a longitudinally extending rail 81 which is disposed medially between the runs of the sprocket chains 63. The rail 81 serves both as a guide and support for the carriers. A rail 82 is disposed under each of the sprocket chains 63 and affords support for the upper runs of the chains against sagging under the weight of the carriers and the articles supported thereon. Another rail 83 vertically spaced below the rail 81 is engaged by the rollers 77 and 79 in the lower run of the sprocket chains.

Arranged below the hopper 23 and slightly rearwardly of the delivery end thereof are a pair of carton set-up elements 84 suitably supported so as to overlie the path of travel of the carriers. Each carton set-up element has a relatively broad flat face with the leading ends 86 sloping upwardly, as illustrated in Figs. 7 and 8. Each of the carton set-up elements is provided with a notch or groove 87 extending transversely across the face thereof, such grooves being in alignment with each other. Resiliently supported substantially in the same horizontal plane as the carton set-up elements by cross bar 85 is a hold down shoe 88 which serves to maintain the carton, when erected as hereinafter described, in erected condition in its continued travel.

Suitably supported on the frame below the combing wheel 38 are a pair of spaced standards 91, each of which has three inwardly projecting arms 92, 93 and 94 in vertically spaced relation and on which arms are carried guide elements 96, 97 and 98 respectively. By reference to Fig. 2, it is apparent that projections are so spaced as to provide for clearance of the side arms 74 and 75 of the carriers in their travel. The guide members serve to align the cartons in proper position as they are delivered to the carriers and moved into engagement with the set-up elements 84. Supported on the guide elements 96 are camming members 89 which are adapted to engage only the upper tabs of a carton as the carton is moved rearwardly on a carrier to effect elevation of the carton A substantially to the position illustrated by the broken lines in Fig. 7 so that it is brought into engagement with the carton set-up elements 84 whereby the leading edge of the carton may engage in the transvers notch 87 in the set-up elements.

Suitably supported on brackets 101 below the forward portions of the set-up elements 84 and at a level substantially equal to that of the bottom 67 of the carriers are a pair of lower tab plows 102 which rise progressively upwardly from the leading to the trailing ends thereof. The said tab plows serve to engage the lower tabs of the carton as the carton is moved in a carrier past the plows and to fold the lower tabs upwardly to assume substantially vertical positions. Positioned rearwardly of the lower tab plows 102, one on each side of the sprocket chains 63, are a pair of tuck-in wheels 103 which, as will be hereinafter more fully explained, are adapted to engage the lower tabs which are already upwardly folded and further fold the tabs inwardly of the cartons flat against the bottom walls thereof. The tuck-in wheels each are supported on a shaft 104 which is journaled for rotation in an arm 106 pivotally supported on a bracket 107. As will be apparent by reference to Fig. 10, the tuck-in wheel 103 is freely movable in and out of the open ends of the carton to apply pressure to the lower tabs, and they are normally urged to swing in a counterclockwise direction, as viewed in Fig. 10, by a spring 108 carried on the end of an eye bolt 109, the head of such bolt extending through an opening in the arm 106 and having a transverse rod element 111 in the eye to engage the inner wall surface of the arm. The tuck-in wheel 103 is caused to swing in and out from the solid line position to the broken line position illustrated in Fig. 10, and, so as to absorb any shock resulting therefrom, a buffer element 112 provided with a spring 113 is carried on the bracket 107, the buffer element being adapted to engage a striking plate 114 carried on the lower end of the arm 106. Additionally, a stop element 116 in the form of a threaded screw is carried in the lower end of the bracket and is adapted to engage the striking plate 114 of the arm 106.

Arranged above the tuck-in wheels 103 are a pair of upper tab breaker or folder bars 117, the said breaker bars being spaced apart substantially the length of the carton and being inclined downwardly and lying in the path of the upper tabs as the cartons are moved past such breaker bars. These breaker bars serve to fold the upper tabs downwardly to assume substantially vertical positions.

Mounted on the shaft 59 for rotation therewith are three conveyor belt pulleys 118, 119 and 120 respectively. Pulleys 118 and 119 are disposed in spaced relation to each other on one side of sprocket wheels 62 and the pulley 120 is disposed on the other side of the sprocket wheels. Similar pulleys similarly identified and arranged are mounted on shaft 61 at the opposite end of the frame. Corresponding pairs of pulleys are adapted to support endless conveyor belts 121, 122 and 123 respectively. Since the sprocket wheels 62 are mounted on the same shaft with the pulleys 118, 119 and 120, it is apparent that the travel of the conveyor belts is synchronized with that of the sprocket chains.

Suitably supported on the frame are U-shaped brackets 124 which embrace portions of the upper runs of the conveyor belts. These brackets are provided with shoulders 125 on which are supported plates 126, which underlie the upper runs of the belts to afford support against sagging under the weight of the cans C carried by the conveyor belts. Supported by the upper portions of the brackets 124, one on each side of each of the conveyor belts, are guide members 127, 128 and 129 respectively. These guide members maintain the cans carried on the conveyor belts in single file relation. As will be seen by reference to Fig. 5, the guide members 128 and 129 immediately adjacent the conveyor chains are arranged symmetrically with the rearward end portions 128a and 129a being angularly directed inwardly so as to deflect the cans in the direction of the carriers moving therebetween. The outer guide member 127 is similarly formed and serve to direct the cans toward the carriers but at a point beyond the guide member 128. Arranged under the angularly directed end portions 127a, 128a and 129a of the can guide members are plates 131, 132 and 133 which are disposed at substantially the same horizontal level as the upper runs of the conveyor belts. These plates form the bottoms for the guide members. The outer ends of the plates are adjacent to the inner edges of the conveyor belts so that the cans may readily pass from the conveyor belts on the plates. As will be seen particularly by reference to Fig. 5, the inner ends of each of the bottom plates are recessed or cut away as at 134 to accommodate a gate element or can stop, indicated generally by the numeral 136. The conveyor belt 122 beyond the angularly directed portion 128a of the guide member 128 passes under the plate 131.

The gate element or can stop 136 is shown in greater detail in Figs. 11 and 12 and comprises an arcuately formed gate portion 137 which normally extends above the plane of an associated bottom plate such as 131, 132 and 133 so as to provide a stop means to arrest the movement of cans on the plate. The gate element is also provided with an integral cam portion 138 which is adapted to be engaged by a lower arm 75 of a carrier 66, as will be hereinafter described. The gate element is pivotally supported on shaft 139 carried on a bracket 141 so that it may be rocked about the axis of the shaft. A spring biased pin 142 slidably supported in the bracket normally abuts the under side of the gate element and serves to urge the same to upright or stopping position, as shown in Fig. 11. Three of such gate elements 136 are provided, each in association with one of the can guide members. Arranged over each of the can guide members substantially along a median thereof are hold-down bars 140 adapted to bear on the top surfaces of the cans as they are moved in the can guide members to prevent any tipping or misalignment resulting from pressure of the cans against each other.

Supported on a post 143 disposed adjacent the discharge end of the can guide members 128 are a pair of camming elements 144 and 146 shaped substantially as illustrated in Fig. 5. These camming elements are spaced vertically as illustrated in Fig. 6 to provide clearance for the movement of the arms 74 and 75 on the carriers. The leading portion 144a of the upper camming element 144 which is disposed above the can guide members 128 extends into the path of travel of the cans, as shown clearly in Fig. 5, so as to cause the leading can C to tip in a direction towards a carrier as it passes by. The trailing portion 144b of the camming element 144 extends progressively inwardly towards the carriers and terminates in a portion 144c parallel to the run of the carriers. The lower camming element 146 is formed substantially like the trailing portion 144b of the upper camming element but does not have a portion corresponding to the leading portion of the upper camming element.

Supported on post 147 opposite to the post 143 are vertically spaced upper and lower camming elements 148 and 149 which are shaped substantially as illustrated in Fig. 5. The upper camming element 148 is provided with a leading portion 148a which extends similarly into the path of travel of the cans in the can guide means 129. Similarly, as in the first instance, the cans are caused to be tipped by the camming element 148 in the direction of the carriers. The trailing portion 148b of the camming element 148 extends gradually inwardly towards the carriers but to a lesser distance than the corresponding portion of the camming elements 144 and 146. The lower camming element 149 is shaped substantially like the trailing portion of the upper element 148 and is in vertical alignment therewith.

Supported on post 151 is a third pair of camming elements 152 and 153 associated with the can guide member 127. These camming elements, similarly as those above described, are arranged in spaced vertical relation and the upper camming element 152 is provided with a leading portion 152a which extends up to but not into the path of travel of the cans in the guide member 127. The trailing portion 152b of the camming element 152 extends inwardly toward the carriers but terminates at a distance from the carriers identical with that of the camming elements 148 and 149. The lower camming element 153 is shaped like the trailing portion of the upper element and is vertically aligned therewith.

Supported on the rearward end of the frame structure are a pair of retaining members 155 which are shaped, as illustrated in Fig. 1, substantially in the form of a semi-circle and are anchored at the top to a cross member 154 of the frame. Additionally, the retaining members 155 are secured at their lower portions by brackets 156 projecting from the side members of the frame. The inner arcuate surface of the retaining members corresponds substantially to the arc described by the upper edges of the cartons in traveling from upright position to inverted position around the axis of the shaft 61. The retaining members serve to prevent the cartons from falling out of the carriers in the course of this inversion.

Positioned adjacent the lower ends of the retaining members 155 is a pulley 157 supported on a shaft 158 carried in bearing blocks 159 mounted on the frame members. A similar pulley 161 is similarly mounted on a shaft 162 at the forward end of the frame structure but at a somewhat lower position and a discharge conveyor belt 163 passes over the pulleys with the upper run of the belt traveling in the direction of the arrow indicated in Fig. 1. The said belt serves to carry off assembled cartons as they drop from the inverted carriers which pass directly over the conveyor belt. While the cartons will drop by gravity from the carriers to the conveyor belt, in order to avoid the possibility of a carton adhering to a carrier, a pair of stripper arms 164 suitably mounted, and arranged, one on each side of the carriers is provided. The stripper arms are inclined downwardly and are adapted to engage portions of the cans projecting outwardly from the cartons and thus force the cartons from the recesses in the carriers so that they drop by gravity onto the conveyor belt 163. As will be apparent by reference to Fig. 1, the stripper arms are so disposed that the lower arms 75 of the carriers which in the inverted position are above the upper arms 74 easily clear the said stripper members. Arranged under the upper arm of the discharge conveyor belt 163 is a supporting plate 166 which sustains the weight of the filled cartons and prevents the upper run of the belt from sagging. The discharge conveyor belt 163 is maintained in taut condition on the pulleys 157 and 161 by an idler pulley 167 carried on a shaft 168 suitably supported on adjustable brackets 169 mounted on the frame members.

The driving means for the apparatus comprises a motor 171 suitably connected to a variable speed controller 172 which is in turn connected through a sprocket chain 173 to a sprocket wheel 174 mounted on shaft 61. Rotation of the shaft 61 drives the sprocket chains 63 and belts 121, 122 and 123. The combing wheel 38 is driven by a sprocket chain 176 running over sprocket wheels carried on shafts 39 and 59 respectively. The discharge conveyor belt 163 is driven by chain 173 which passes over a sprocket wheel 177 on shaft 158. An idler pulley 178 mounted on the frame serves to direct the sprocket chain over the sprocket wheel 177.

The operation of the packing apparatus should be apparent from the foregoing description, but briefly stated it is as follows:

A quantity of cartons A in collapsed condition is placed within the hopper 23 with the bottom edges of the cartons resting on the bottom of the hopper. The cartons are urged by the roller weight 51a to the delivery end of the hopper and also by the action of the roller 51 on the bottom edges of the cartons. The cartons in the hopper are caused to assume an inclined position as illustrated in Fig. 7 by reason of the member 32. With each rotation of the combing wheel 38, the resilient member 57 is caused to bear against the leading carton in the hopper and to displace the same from the hopper downwardly into the space below the combing wheel. In synchronism with the displacement of the carton, a carrier 66 is moved into position to receive the carton. The carton may drop first on the guide members 73 of the carrier preceding the one intended to receive the carton. Thus, the carton is supported in inclined position on the guide members 73 of the preceding carrier with the lower edge of the carton resting against the rear wall 72 of the carrier, as illustrated in Fig. 7. As the carrier advances in the direction of the arrow, the upper tabs of the carton are caused to engage the guide members 89 which act to elevate the carton substantially to the position indicated by the dotted lines in Fig. 7 so that the leading edge of the carton is caused to engage the groove 87 in each of the carton set-up elements 84. As illustrated in Fig. 16, continued movement of the carrier with the leading edge of the carton held in the groove against movement causes the carton to be erected to the rectangular condition illustrated in Fig. 17. The hold-down bar 86 bearing on the top of the carton assures the maintenance of this erected condition for the performance of other operations. As the carton advances further, the lower tabs are engaged by the plows 102 which cause the tabs to be turned upwardly to assume substantially vertical positions. As the cartons pass the tuck-in rollers 103 the said rollers are caused to enter into the open ends of the cartons to press the lower tabs against the bottom wall of the carton, as illustrated in Fig. 10. Continued movement of the carton brings the upper tabs into engagement with breaker bars 117 which cause the upper tabs to be folded downwardly at least to assure that the tabs extend downwardly inclined from the plane of the top wall of the carton. It will be understood that a series of cans C will have been placed on the conveyor belts 121, 122 and 123 so as to be carried by the said belts to the respective can guide members 127, 128 and 129 in continuous lines. Thus, prior to a carrier moving into registration with any of the can guide members there is already disposed in each of said can guide members a leading can in position to be acted upon, as will be presently described. Each of the leading cans is retained against further movement by the gate elements 136 associated with a respective can guide member. As the carrier moves into close proximity to the oppositely disposed can guide members 127 and 128, the lower arms 75 of the carrier engage the camming portions 138 of the gate elements and effect downward pivotal movement of the gate 137 so that the cans may move off of the supporting plates 132 and 133. Each can is then engaged by both of the arms 74 and 75 which urge the can against the respective camming elements 144 and 148 so that the can is caused to follow the contour of the said camming elements and be progressively urged into the open end of the carton which is then in proper registration with the can guide members. During such movement the can in each of the guiding means is caused to be tipped forwardly, as illustrated in Figs. 12 and 13, with the lower chime engaging the camming portion 65 projecting from each of the carriers. The top chime of the can first engages the upper tab and enters into the open end of the carton while folding the tab upwardly. Thereafter, the can is caused to be elevated along the camming portion 65 until the lower chime of the can reaches the top edge of the said camming portion. At this point the axis of the can is substantially vertical and the lower chime engages the lower tab. As the carrier continues to move, the camming elements 144 and 148 urge the cans from opposite sides within the carton. It will be apparent, however, that the camming element 144 which extends in closer proximity to the carrier will urge the can on which it is operating almost entirely into the carton while the opposite camming element 148 only urges the respective can about halfway into the carton to a point where the tabs when folded-in abut the upper and lower chimes of the can, thereby to retain the said can from being inadvertently displaced outwardly. As the carrier continues to move along its path of travel, the gate element associated with can guide member 127 is caused to be pivoted downwardly, in the manner hereinbefore explained, and the leading can in the said can guide members is engaged by the arms 74 and 75 of the carrier and urged against the camming elements 152 and 153 whereby the can is urged in a direction to enter into the carton. It will be apparent that the latter can must first push into the carton the previously inserted can before it can itself enter in the open end of the carton. The camming elements 152 and 153 continue to act on the last can until the preceding can assumes a position substantially in the center of the carton while the last can assumes a position corresponding to the can on the opposite side of the carton wherein the upper and lower flaps of the carton engage with the chimes of the can to retain the same against displacement. In fully assembled condition the cans assume the positions in a carton, as illustrated in Fig. 18.

The fully loaded carton is then carried in the carrier around the sprocket wheels at the rearward end of the apparatus, the loaded cartons being supported against displacement from the carriers by the retaining members 155. The carton then is brought around to inverted position and will normally fall by gravity onto the discharge conveyor belt 163 which will carry it to a discharge point at the front end of the apparatus. In the event that the carton does not itself fall by gravity, the stripper members 164 engage the sections of the cans projecting from the carton and cause the carton to be stripped from the carrier and to drop on the conveyor belt. The cartons may be taken from the conveyor discharge belt by any suitable means, such as for example a conveyor belt.

Since many changes and variations of the disclosed embodiment of the invention may be made without departing from the scope of the inventive concept, it is not intended to limit the invention otherwise than as required by the appended claims, with due regard to the spirit as well as the literal wording thereof.

What is claimed is:

1. A packaging apparatus for opening and erecting cardboard cartons and loading cans into said cartons, the combination comprising a plurality of carriers movable in spaced relation along a path of travel, carton feed means arranged to deliver a collapsed carton successively to each of the carriers, means for erecting and opening each carton as it is moved on a carrier, a can guide means on each side of the path of travel of the carriers, the guide means being oppositely directed, at least a third can guide means beyond one of the first mentioned can guide means, means for delivering cans in succession to each of the guide means, gate means associated with each of the can guide means for arresting movement of cans through the guide means, cam means associated with each of the guide means, means on each of the carriers for opening a respective gate means as a carton is moved into registration with the guide means, means on the carriers engageable with the leading can in respective guide means, first to urge the cans from the oppositely directed can guide means into engagement with respective cam means whereby said cans are moved simultaneously into opposite open ends of said carton, said means on the carriers thereafter being engageable with the leading can in the third can guide means to similarly move such leading can into the corresponding end of the carton.

2. A packaging apparatus for opening and erecting cardboard cartons having tabs extending from the open ends and loading cans into the erected cartons, the combination comprising a plurality of carriers arranged in spaced relation and movable along a path of travel, carton feed means arranged to deliver a collapsed carton successively to each of the carriers, means for erecting and opening a carton as it is moved in a carrier, means for folding the carton tabs inwardly, can guide means on opposite sides of the path of travel of the carriers, means for delivering cans in succession to each of the guide means, gate means for intermittently arresting the movement of the cans through the guide means, means on the carriers for opening the gate means when a carton is moved into registration with the guide means, cam means associated with the guide means and other cam means associated with each of the carriers, means on the carriers engageable with the leading can in a guide means to urge the can into engagement with respective cam means whereby the can is tipped forwardly in the direction of its movement and moved into an open end of a carton.

3. A packaging apparatus for opening and erecting cardboard cartons and loading cans into such cartons, the combination comprising a plurality of carriers movable in spaced relation along a path of travel, carton feed means arranged to deliver a collapsed carton successively to each of the carriers, means for erecting and opening a carton as the same is moved in a carrier, can guide means on opposite sides of the path of travel of the carriers, means for delivering cans in succession to each of the can guide means, gate means for arresting movement of the cans through the guide means, cam means associated with the guide means, means on each of the carriers for opening the gate means as a carton is moved into registration with the guide means and other means on the carriers engageable with the leading can in the guide means to urge the can into engagement with the cam means whereby the can is moved into an open end of the carton.

4. An apparatus for use in loading cans into erected, open end cartons comprising in combination a plurality of carriers movable in spaced relation along a path of travel, each of the carriers being adapted to support an erected carton, can guide means on opposite sides of the path of travel of the carriers, means for delivering cans in succession to each of the guide means, means for moving cartons successively in registration with the can guide means, gate means for intermittently arresting movement of the cans through the can guide means, cam means associated with the can guide means, and means on the carriers engageable with the leading can in each of the guide means to urge each of the cans into engagement with respective cam means whereby the cans are successively tipped forwardly and each moved successively into an open end of the carton.

5. An apparatus for use in loading cans into erected cartons having at least one open end, comprising in combination a plurality of carriers movable in spaced relation along a path of travel, each of the carriers being adapted to support an erected carton, at least one can guide means adjacent the path of travel of the carriers, means for delivering cans in succession to the can guide means, means for moving cartons succesively into registration with the can guide means with the open ends of the cartons directed towards the can guide means, gate means for intermittently arresting movement of the cans through the can guide means, means for opening the gate means when a carton is moved into registration with the guide means, cam means associated with the can guide means and means on the carriers engageable with the leading can in the can guide means to urge the can into engagement with the cam means whereby the can is moved into the open end of the carton.

6. In an apparatus for loading articles into cartons, carton feed means comprising a hopper formed with a longitudinal slot in the bottom thereof, said hopper being inclined downwardly toward the delivery end and being adapted to contain a plurality of collapsed cartons stacked edgewise, a retarder finger projecting through the slot into the hopper at the delivery end thereof, a combing wheel arranged at the delivery end of the hopper in close proximity to the retarder finger, the combing wheel being mounted for rotation about an axis extending transversely of the hopper and carrying a friction element on its periphery, and means for driving the combing wheel whereby the friction element with each rotation of the combing wheel is caused to engage the leading carton in the hopper and to displace the same downwardly from the hopper.

7. A packaging apparatus for opening and erecting cartons having tabs extending from top and bottom walls at the open ends and loading cans into the erected cartons, the combination comprising a plurality of carriers arranged in spaced relation and movable along a path of travel, each of the carriers having downwardly inclined supporting means extending rearwardly thereof, carton feed means arranged to deliver a collapsed carton successively to each of the carriers with the lower edge of each carton resting on a carrier and the carton supported in forwardly inclined position on the supporting means of the carrier immediately preceding, means disposed adjacent the path of travel of the carriers arranged to engage the leading edge of each of the cartons and to co-act with the moving carriers to open the carton to fully erected condition, means for maintaining the cartons in erected condition during movement of the carriers, means disposed along the path of travel of said carriers and engageable with the tabs to fold them inwardly, can guide means on opposite sides of the path of travel of the carriers, means for delivering cans in succession to each of the guide means, gate means for intermittently arresting the movement of the cans through the guide means, means on the carriers for opening the gate means when a carton is moved into registration with the guide means, cam means associated with the guide means and other cam means associated with each of the carriers, means on the carriers engageable with the leading can in a guide means to urge the can into engagement with respective cam means whereby the can is tipped forwardly in the direction of its movement and moved into an open end of a carton.

8. A packaging apparatus for opening and erecting cartons and loading cans into the cartons, the combination comprising a plurality of carriers supported at regularly spaced intervals on an endless conveyor means having upper and lower runs with the carriers in the upper run assuming an upright position and the carriers in the lower run assuming an inverted position, carton feed means arranged to deliver a collapsed carton successively to each of the carriers, means for erecting and opening each carton as the same is moved by a carrier, two can guide means disposed one on each side of the conveyor means, at least a third can guide means beyond one of the first mentioned can guide means, a conveyor belt communicating with each of the can guide means for delivering cans thereto, gate means associated with each of the can guide means for arresting movement of cans through the guide means, cam means associated with each of the guide means, means on each of the carriers for opening a respective gate means as a carton is moved into registration with the guide means, means on the carriers engageable with the leading can in respective guide means first to urge the cans from the oppositely directed can guide means into engagement with respective cam means whereby the cans are moved simultaneously into opposite open ends of the carton, said means on the carriers thereafter being engageable with the leading can in the third can guide means to similarly move the can into the corresponding end of the carton, and means disposed below the lower run of the carrier conveyor means to receive and convey loaded cartons which drop from the inverted carriers.

9. A packaging apparatus for opening and erecting cartons having tabs extending from top and bottom walls at the open ends and loading cans into the erected cartons, the combination comprising a plurality of carriers supported at regularly spaced intervals on an endless conveyor means having upper and lower runs with the carriers in the upper run assuming an upright position and the carriers in the lower run assuming an inverted position, carton feed means arranged to deliver a collapsed carton successively to each of the carriers, means for erecting and opening a carton as the same is moved by a carrier, means along the path of travel of the carriers for folding said tabs inwardly, a can guide means on each side of the conveyor means, a conveyor belt communicating with each of the can guide means for delivering cans thereto, gate means for intermittently arresting the movement of the cans through the guide means, means on the carriers for opening the gate means when a carton is moved into registration with the guide means, cam means associated with the guide means and other cam means associated with each of the carriers, means on the carriers engageable with the leading can in a guide means to urge a can into engagement with respective cam means whereby the can is tipped forwardly in the direction of its movement and moved into an open end of a carton, and means disposed below the lower run of the carrier conveyor means to receive and convey loaded cartons which drop from the inverted carriers.

10. A packaging apparatus for opening and erecting cartons having tabs extending from top and bottom walls at the open ends and loading cans into said erected cartons, the combination comprising a plurality of carriers supported at spaced intervals on an endless conveyor means having upper and lower runs with the carriers in the upper run assuming an upright position and the carriers in the lower run assuming an inverted position, each of the carriers having downwardly inclined supporting means extending rearwardly thereof, carton feed means arranged to deliver a collapsed carton successively to each of the carriers with the lower edge of each carton resting on a carrier and the carton disposed in a forwardly inclined position on the supporting means of the carrier immediately preceding, means along the path of travel of the carriers arranged to engage the leading edge of a collapsed carton and to co-act with a moving carrier to open the carton to fully erected condition, means for maintaining the cartons in erected condition during movement of the carriers, means disposed along the path of travel of the carriers and engageable with the tabs to fold the same inwardly, a can guide means on each side of the conveyor means, a conveyor belt communicating with each of the can guide means for delivering cans thereto, gate means for intermittently arresting the movement of the cans through the guide means, means on the carriers for opening the gate means when a carton is moved into registration with the guide means, cam means associated with the guide means and other cam means associated with each of the carriers, means on the carriers engageable with the leading can in a guide means to urge the can into engagement with respective cam means whereby the can is tipped forwardly in the direction of its movement and moved into an open end of a carton, and means disposed below the lower run of the carrier conveyor means to receive and convey assembled cartons which drop from the inverted carriers.

11. A packaging apparatus for opening and erecting cartons having tabs extending from top and bottom walls at the open ends and loading cans into the erected cartons, the combination comprising a plurality of carriers supported at spaced intervals on an endless conveyor means, carton feed means arranged to deliver a collapsed carton successively to each of said carriers, means for erecting and opening a carton as the same is moved by a carrier, means for folding the tabs inwardly, can guide means on opposite sides of the path of travel of the carriers, means for delivering cans in succession to each of the guide means, each of the carriers having a pair of vertically spaced arms extending laterally from the side edges thereof, a gate element pivotally mounted at the end of each of the guide means for arresting the movement of cans through the guide means, the gate element having a camming portion, the lower arms of the carriers being adapted to engage said camming portions to move the gate element downwardly when a carton is moved into substantial registration with a can guide means, cam means associated with the guide means, the arms on the carriers being engageable with the leading cans in the guide means to urge the cans into engagement with respective cam means whereby the cans are individually tipped forwardly in the direction of their respective movement and individually moved into an open end of a carton.

VERLON E. SWAFFORD,
*Administrator of the estate of Carl R. Swafford, deceased.*

References Cited in the file of this patent

UNITED STATES PATENTS

| Number | Name | Date |
|---|---|---|
| 767,395 | Doble | Aug. 16, 1904 |
| 1,873,059 | Smith | Aug. 23, 1932 |
| 2,521,996 | Ray | Sept. 12, 1950 |
| 2,570,146 | Mettler | Oct. 2, 1951 |